Sept. 14, 1965 G. R. BRIGGS 3,206,734
MEMORY SYSTEMS HAVING FLUX LOGIC MEMORY ELEMENTS
Filed Feb. 28, 1961 4 Sheets-Sheet 1
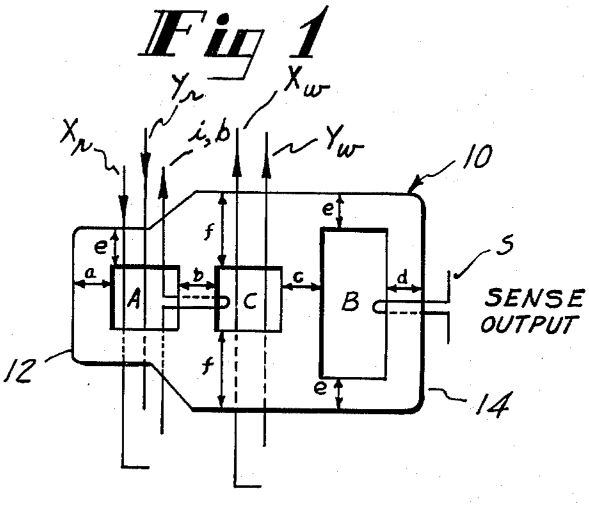
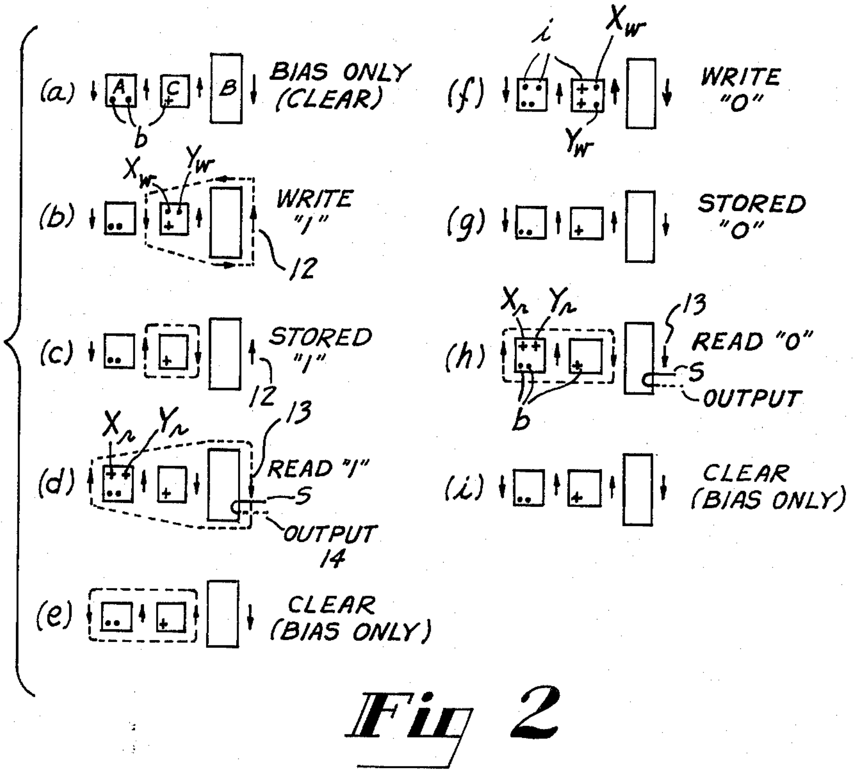
Fig 2
INVENTOR.
GEORGE R. BRIGGS
BY
Carl V. Olson

MEMORY SYSTEMS HAVING FLUX LOGIC MEMORY ELEMENTS

Filed Feb. 28, 1961 4 Sheets-Sheet 2

INVENTOR.
GEORGE R. BRIGGS
BY
Carl V. Olson

D= DUMMY APERTURES

INVENTOR.
GEORGE R. BRIGGS
BY
Carl V. Olson

D= DUMMY APERTURES

INVENTOR.
GEORGE R. BRIGGS
BY
Carl V. Olson

United States Patent Office 3,206,734

Patented Sept. 14, 1965

3,206,734

MEMORY SYSTEMS HAVING FLUX LOGIC MEMORY ELEMENTS

George R. Briggs, Princeton, N.J., assignor to Radio Corporation of America, a corporation of Delaware Filed Feb. 28, 1961, Ser. No. 92,264

4 Claims. (Cl. 340—174)

This invention relates to random access memory systems, and more particularly to a planar memory structure made of a plurality of memory elements which are provided with printed windings passing through apertures in the memory elements.

This application is directed to a magnetic memory system operating in an X-Y selection, inhibited, biased, flux logic mode, while my concurrently filed application, Serial No. 92,263 is directed to a magnetic memory system operating in an inhibited, word selection, flux logic mode.

Random access magnetic memory systems are useful in many applications, for example, in high speed electronic computer and data processing apparatus. Memory systems in such apparatus are costly. This is because such a memory system may be required to store a very large amount of randomly accessible information, and because the known high performance memory systems have required laborious and painstaking effort in fabrication, assembly and wiring. For example, large numbers of toroidal cores have been arranged in three-dimensional arrays and threaded with wire conductors. The application of mass production techniques, such as photoetching and printed wiring techniques, to memory construction has been difficult because the good magnetic characteristics of ferrite materials are often accompanied by undesirable physical qualities, and because the good physical qualities of other magnetic materials are often accompanied by inadequate magnetic characteristics.

It is, therefore, an object of this invention to provide an improved random access memory construction employing inexpensive and easily handled magnetic sheet material in a mass producible configuration providing high performance memory operation characteristics as regards speed of operation, driving current amplitudes, signal-to-noise ratio, cross talk, ratio of output "1" amplitude to output "0" amplitude and general reliability.

It is another object of this invention to provide an improved planar memory structure which contains a large number of magnetic memmory elements and which is relatively easy to manufacture by photoetching and printed wiring techniques.

It is a further object of this invention to provide an improved planar magnetic memory structure which is small and compact in physical dimensions.

It is a still further object of this invention to provide a memory plane including transfluxor memory elements having an improved arrangement of windings linking apertures of the memory elements.

It is yet another object to provide improved memory systems operating in an X-Y selection, inhibited, biased, flux logic mode.

In one aspect, the invention comprises a planar memory structure including a sheet of magnetic material cut away in a pattern defining a plurality of flux logic or transfluxor memory elements each having a first aperture near a first edge, a second aperture near a second opposite edge and a third central aperture. The transfluxor elements are systematically arranged in Y columns and X rows with the first edges of two adjacent elements near each other and the second opposite edges of two adjacent elements near each other. A printed X read winding on the sheet extends through the first apertures of all memory elements in a row. A printed Y read winding on the sheet extends through the first apertures of all memory elements in a column. An X write winding printed on the sheet extends through the central apertures of all memory elements in a row. A printed Y write winding on the sheet extends through the central apertures of all memory elements in a column. A printed sense winding on the sheet extends through the second apertures of all memory elements on the sheet. Inhibit and bias winding means extend through the first and third central apertures of all the memory elements on the sheet. The winding schemes of the invention are also applicable to transfluxor memory elements made of ferrite or made of thin magnetic films.

These and other objects and aspects of the invention will be apparent to those skilled in the art from the following more detailed description taken in conjunction with the appended drawings, wherein:

FIGURE 1 is a diagram illustrating a single flux logic or transfluxor memory element having apertures and winding conductors threaded in a manner following the teachings of the invention;

FIGURE 2 is a series of diagrams which will be referred to in describing the operation of the memory element of FIGURE 1 when a binary "1" is written into and read out of the element, and when a binary "0" is written into and read out of the memory elements;

Figure 5:
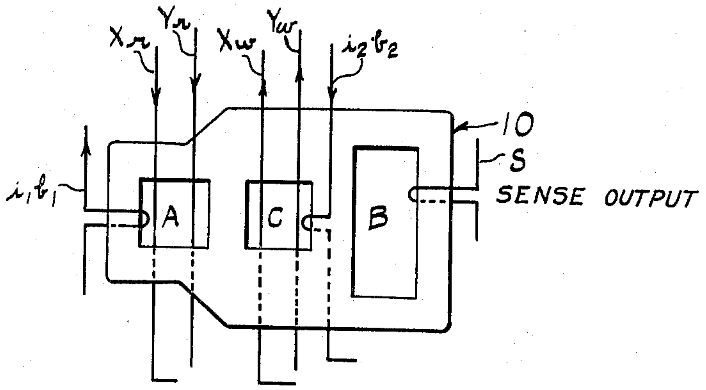
FIGURE 5 is a diagram illustrating another transfluxor memory element differing from the element of FIGURE 1 in that two separate inhibit and bias windings are provided, each being adapted to carry a portion of the inhibit current and a portion of the bias current.
Figure 7:
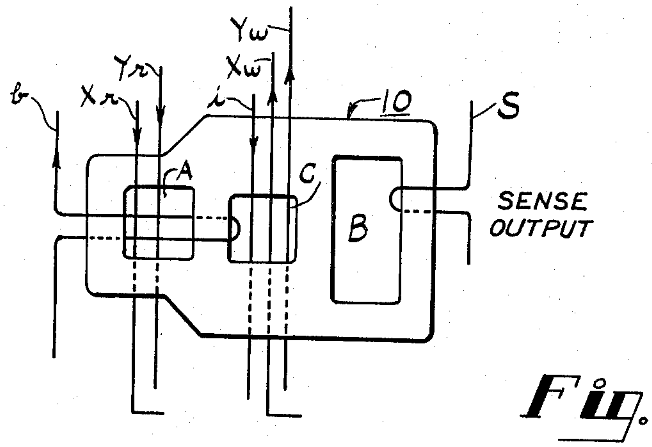
Figure 8:
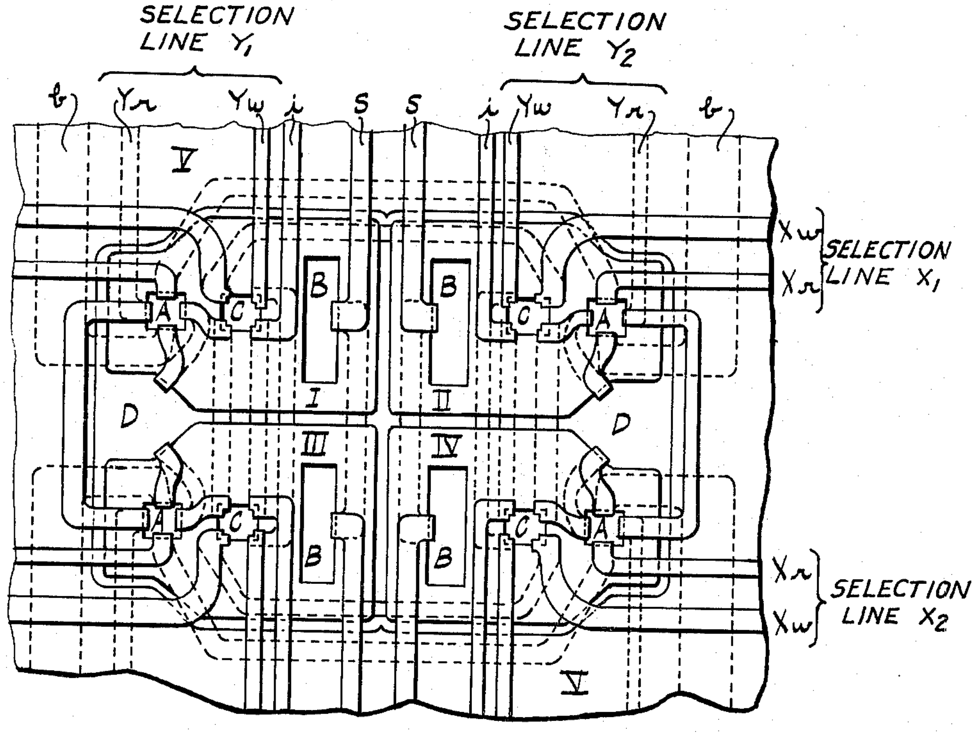

FIGURE 7 is a diagram illustrating a transfluxor memory element having windings differing from those of FIGURES 1 and 5 in that two independent windings are provided for the bias and inhibit currents, respectively; and FIGURE 8 shows a fragmentary portion of a planar memory structure made of a magnetic memory sheet having four transfluxor memory elements provided with windings according to the scheme illustrated in FIGURE 7.

Referring now in greater detail to the drawings, FIGURE 1 shows an inhibited, biased, X-Y selected flux logic memory element, which advantageously is a transfluxor memory element 10 having a first aperture A near a first edge 12, having a larger aperture B near a second opposite edge 14 and having a third central aperture C. The transfluxor element 10 is preferably constructed, as by photoetching, from a thin sheet of magnetic metal alloy such as 4–79 molybdenum permalloy, or 50–50 nickel-iron, or other magnetic metal alloy. Separate X and Y read windings $X_r$ and $Y_r$ extend through the first aperture A; and separate X and Y write windings $X_w$ and $Y_w$ extend through the third central aperture C. A sense winding S extends through the second aperture B. A combination inhibit and bias winding *i,b*, has a figure-eight configuration such that it extends through the aperture A twice and extends through the aperture C once.

The memory element 10 is preferably constructed with the following relative dimensions. The legs *a, b, c, d,* and *e* are of equal dimension, and may be ten mils. The legs *f* are each equal to twice the dimension of the other legs and may be twenty mils (milli-inches). The apertures A and C are equal and may be twenty-two mils square. The aperture B is larger and may be twenty-two mils by forty-six mils.

FIGURE 2 illustrates the biased, inhibited, X-Y selection mode of operation of the flux logic or transfluxor memory element 10 of FIGURE 1. The diagram (*a*) of FIGURE 2 illustrates the directions of the flux around the three apertures when the memory element is in the clear position with only bias currents *b* flowing in the apertures A and C. The bias *b* is represented in the aperture A by two dots indicating two units of currents flowing up out of the paper, and is represented by a cross sign in aperture C to indicate a single unit of current flowing down into the paper. The bias current is continuously supplied to the memory element, and therefore all the diagrams in FIGURE 2 include the representations of the bias current.

The bias current through the first aperture A is made to have a value equal to the X read current $X_r$, which is in turn equal to the Y read current $Y_r$. The bias current provides a threshold which is not overcome by an $X_r$ current alone or by a $Y_r$ current alone. The bias threshold is overcome only by coincidence of the $X_r$ and $Y_r$ currents. Similarly, the bias current in the third central aperture C is overcome only by coincidence of the two write currents $X_w$ and $Y_w$.

Diagram (*b*) of FIGURE 2 illustrates the changed flux conditions resulting from the writing of a "1" into the memory element by the simultaneous flow of an X write current $X_w$ and a Y write current $Y_w$ through the third central aperture C. The flux arrow 12 has a direction representing the fact that a "1" is stored in the element. It is seen from diagram (*c*) that when the X and Y write currents are removed, the "1" represented by the flux arrow 12 remains stored in the element.

Diagram (*d*) of FIGURE 2 illustrates the reading out of the stored "1" by the simultaneous flow of X and Y read currents $X_r$ and $Y_r$ through the first aperture A in a direction opposite to that of the bias current therein. The simultaneous read currents cause a reversal of the flux 12 to the direction 13 to provide an output pulse 14 on the sense winding S. After the read currents are removed, the state of the memory element is returned by the bias *i,b* to the original cleared state represented in digrams (*e*) and (*a*).

Diagram (*f*) of FIGURE 2 illustrates the writing of a "0" into the memory element by the simultaneous application of an inhibit current *i* through winding *i,b* extending through apertures A and C, and an X write current $X_w$ and a Y write current $Y_w$ through correspondingly designated winding extending through the central aperture C. The resulting flux, shown in diagrams (*f*) and (*g*) representing the stored "0," is the same as the flux in the diagrams (*a*) and (*e*) representing the cleared state. Diagram (*h*) illustrates the reading out of the stored "0" by the simultaneous application of X and Y read currents through the first aperture A in a direction opposite to that provided by the bias *b*. There is no reversal of the flux 13 and no output is provided in the output winding S.

In the memory element 10 of FIGURE 1, the use of separate read windings $X_r$ and $Y_r$ extending through the first aperture A, and separate write windings $X_w$ and $Y_w$ extending through the central aperture C, permits the use of simplified driving circuitry, compared with arrangements where an X winding and a Y winding extending through the central aperture is used for both reading and writing. Another important advantage of the arrangement is that the read windings $X_r$ and $Y_r$ extend through the aperture A which is furthest removed from the output aperture B. Thereore, half read pulses ($X_r$ or $Y_r$) cause only insignificantly small disturbs in the output sense winding S. It is important that the disturb outputs on reading be small so that the desired output information signal from the selected element is not swamped by the cumulative noise generated in the sense windings of many half selected memory elements. This noise cannot be eliminated by known checker-board winding techniques because the disturb signal amplitudes depend on the storage states of the elements, being larger in elements in which a "1" is stored.

In the operation of the memory element of FIGURE 1, a short period of time may be allowed to elapse after energization of the read windings $X_r$ and $Y_r$ before the write windings $X_w$ and $Y_w$ (and *i* if a "0" is being written) are energized to write the next following information bit. However, it has been found that faster and equally satisfactory operation can be had by energizing the write windings immediately upon the termination of energization of the read windings. This compressed memory cycle does not permit sufficient time between reading and writing for the bias *b* to switch the flux in the leg of the core between apertures B and C. However, the writing operation is unaffected by whether or not the leg between B and C has been switched by the bias.

In the arrangements just described, the reading out of information stored in magnetic memory elements results in the destruction of the stored information in the element in that the element is in the cleared state after any reading. The memory element of FIGURE 1, it has been found, can be arranged in the X-Y selection mode to read the stored information non-destructively by arranging the read drive sources to apply $X_r$ and $Y_r$ pulses of short duration compared to those supplied during a destructive read. Pulses of about one microsecond duration have been used for non-destructive reading in memory elements of one mil (.001 inch) thick metal.

The operation illustrated in FIGURE 2 of the flux logic or transfluxor memory element relies primarily on the geometry of the element, and relies secondarily on the magnetic characteristics of the material from which the element is made. The memory elements can be made from thin sheets of a magnetic alloy having hysteresis squareness properties, measured about the apertures, which are poorer, with respect to rectangularity, than has been considered necessary or desirable for conventional memory purposes. The flux logic mode of operation provides ample discrimination between the "1" and "0" storage states, and avoids diminution or destruction of the flux corresponding to the stored states by disturb signals. The operation is not dependent upon the existence of a coercive force or threshold of switching in the magnetic material, with the result that driving pulses of unlimited amplitude can be applied to switch the magnetic flux directions very rapidly. Therefore, the memory elements can be constructed of magnetic metal such as 4–79 molybdenum permalloy having a very small coercive force (0.02 oersted), and such material provides fast switching coefficients (product of switching time and driving field), especially when the sheet material is thin (0.1 to 0.5 mil). Switching coefficients of 0.18 oersted-microsecond have been obtained, and this compares very favorably with the switching coefficients obtained with the best ferrite materials.

Figure 3:
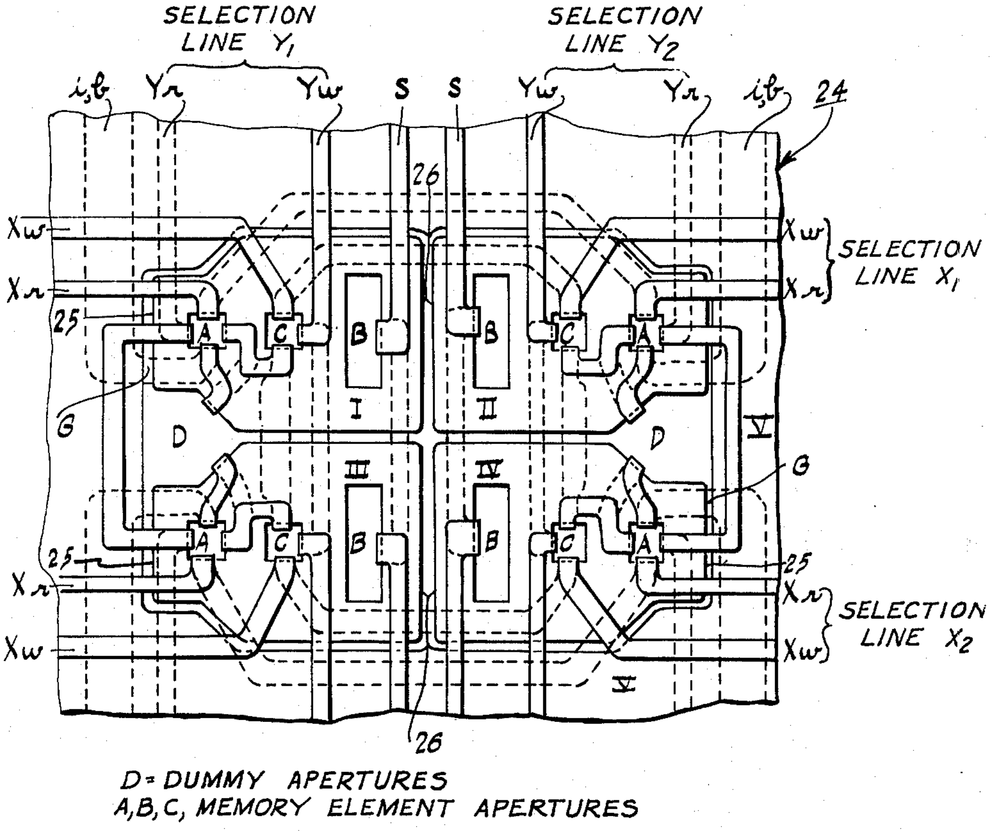
FIGURE 3 shows a fragmentary portion of a planar memory structure including a magnetic metal sheet having gaps cut in the sheet to define four transfluxor memory elements magnetically separated from the remainder of the sheet, and having printed windings extending through apertures in the memory elements.

FIGURE 3 shows a fragmentary portion of a planar memory structure, the portion including a magnetic memory sheet 24 having narrow gaps G cut therein to define four transfluxor elements I, II, III and IV surrounded by the remainder V of the sheet. Portions D of the gaps are enlarged to effectively constitute auxiliary apertures D. Each transfluxor memory element is provided with a first main aperture A near one edge 25, a second larger main aperture B near the opposite edge 26, and a third central main aperture C. The transfluxor memory elements are systematically arranged in Y columns and X rows with the edges 26 of two adjacent elements near each other. Additional groups (not shown) of the four transfluxor elements as shown in FIGURE 3 are systematically repeated on the sheet 24 so that the edges 25 of adjacent memory elements are also near each other.

The winding arrangement illustrated in FIGURE 3 follows the general scheme illustrated above in connection with FIGURE 1. It will be noted that Y read and Y write windings $Y_r$ and $Y_w$ extend through the first and central apertures respectively, of all memory elements in a Y selection column, and that the X read and X write windings $X_r$ and $X_w$ extend through the first and central apertures, respectively, of all the memory elements in an X selection row. A combination inhibit and bias winding $i,b$ extends through the apertures A and C of all the memory elements on the sheet.

The memory sheet 24 may be constructed by coating both sides of a magnetic metal sheet (such as 4–79 molybdenum permalloy) with a photoresist material. The photoresist on one side of the sheet is exposed in a pattern defining the main apertures A, B and C, and the auxiliary apertures D, and the photoresist on the other side of the sheet is exposed in a registered pattern also defining the apertures A, B, C and D, but further defining gaps G which outline the memory elements I, II, III and IV. The photoresist is then developed and the magnetic metal sheet is etched to provide plurality of magnetically isolated transfluxor memory elements supported in relation to each other and in relation to the remainder V of the sheet by means of an insulated substrate constituted by the photoresist on one side of the sheet, and to provide apertures A, B, C and D extending through the transfluxor elements and the layer of photoresist on both sides thereof. The surfaces of the sheet and the insides of the apertures are then coated with an insulating material. The insulating material is not represented in FIGURE 3 for reasons of clarity of illustration. Thereafter, the windings are printed on the insulated sheet in the configurations that are illustrated in FIGURE 3.

It will be noted that each winding extends along one surface of the sheet, goes down into an aperture, goes along the opposite side of the sheet, emerges from a corresponding aperture of the next adjacent transfluxor element, and then continues along the first side of the sheet to the next adjacent memory element. The winding scheme is thus seen to be relatively simple, and at the same time, the winding scheme is one which does not involve an undesired linkage with the magnetic metal sheet material V surrounding the transfluxor elements. The undesired linkage of the surrounding material V is prevented by the geometric arrangement of the storage elements in units or groups of four, and by the illustrated arrangement including the auxiliary apertures D. Each winding conductor extends in opposite directions through two apertures which do not have any of the framing or surrounding magnetic material V between them. This avoids a linking with the magnetic material V. It will be noted that the combination inhibit and bias winding $i,b$ is a figure-eight type of winding which extends through each aperture A twice in the same direction. This is accomplished without linking any of the framing or surrounding material V by printing the winding to extend through the adjacent auxiliary apertures D.

Figure 4:
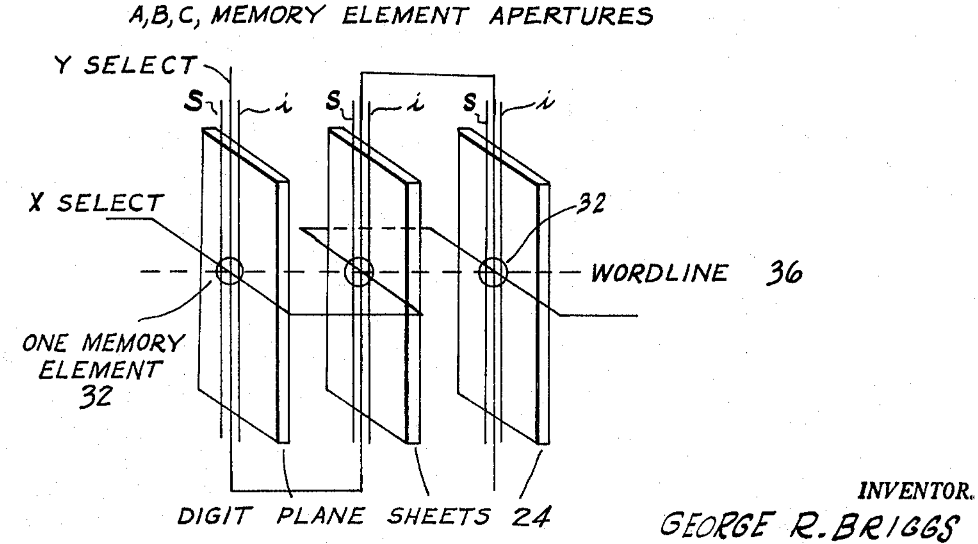
FIGURE 4 is a representation illustrating the manner in which a number of planar memory structures may be organized in a memory system.

FIGURE 4 illustrates how a large number of planar memory structures or sheets 24 may be organized to provide a complete memory unit. In FIGURE 4, each memory sheet 24 exists in a respective digit plane and is illustrated as including one memory element 32. The corresponding memory elements 32 on all the digit plane sheets 24 exist along a word line 36. All the memory elements 32 along the word line 36 are selected by energizing the appropriate X selecting read or write winding, and energizing the appropriate Y selecting read or write winding. The inhibit windings $i$ associated with the respective digit planes are selectively energized in connection with the writing of "0." The respective sense windings $s$ associated with the individual digit plane sheets provide digit outputs of the word when X and Y read currents are applied to the X and Y read windings.

FIGURE 5 illustrates a flux logic memory element 10 differing from the one shown in FIGURE 1 in that a combination inhibit and bias winding $i_1b_1$ extends through solely the aperture A, and another combination inhibit and bias winding $i_2b_2$ extends through solely the central aperture C. The construction illustrated in FIGURE 5 is somewhat less difficult to manufacture in very small sizes because the maximum number of windings extending through a single aperture is three, whereas the construction of FIGURE 1 involves four windings extending through the aperture A.

Figure 6:
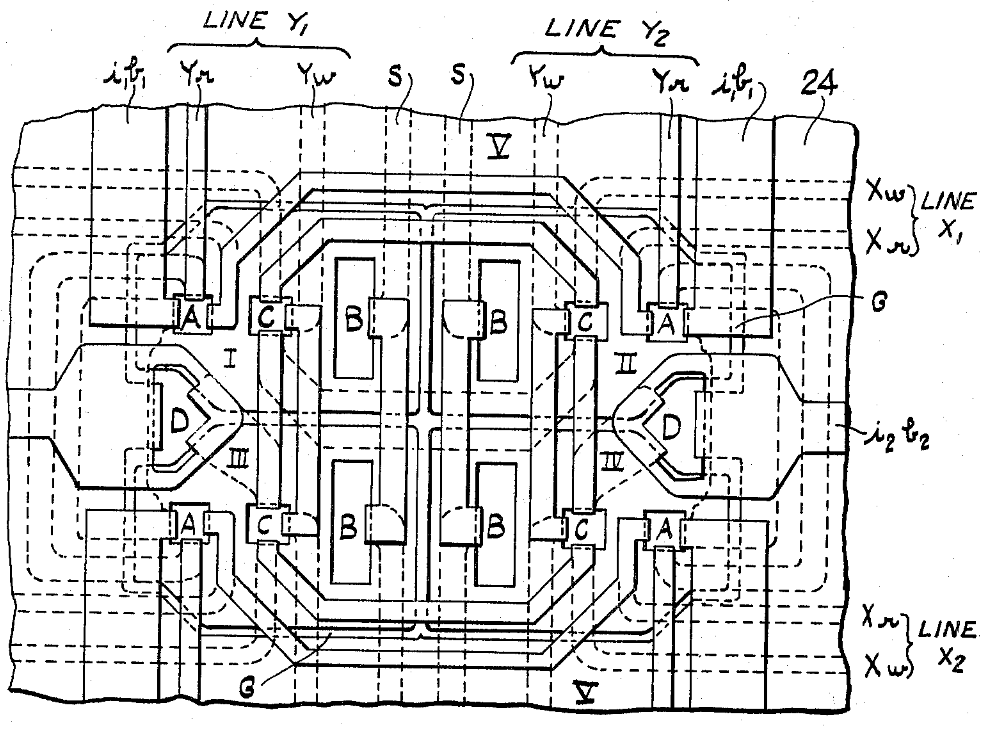
FIGURE 6 is a fragmentary portion of a planar memory structure having a magnetic metal sheet including four magnetic memory elements provided with windings according to the organization illustrated in FIGURE 5.

FIGURE 6 shows a fragmentary portion of a sheet memory structure, the portion including the magnetic metal sheet 24 having a $Y_r$ winding extending through the first apertures A of all elements in a column, a $Y_w$ winding extending through the central apertures C of all elements in a column, a sense winding S extending through the apertures B of all elements on the sheet, an $X_w$ winding extending through the central apertures C of all memory elements in a row, and an $X_r$ winding extending through the first apertures A of all elements in a row. The arrangement of FIGURE 6 also includes a combination inhibit and bias winding $i_1b_1$ extending the first apertures A of all memory elements on the sheet, and a second combination inhibit and bias winding $i_2b_2$ extending through the third central apertures C of all memory elements on the sheet.

FIGURE 7 shows a flux logic memory element provided with a winding arrangement different from those illustrated in FIGURES 1 and 5 in that an inhibit winding $i$ extends through solely the central aperture C, and a bias winding $b$ extends through apertures A and C in a figure-eight pattern. This arrangement involves additional complexity in manufacture of the memory structure because there are four windings extending through each of the apertures A and C. However, the arrangement of FIGURE 7 permits of considerable simplification in the electronic circuitry associated with the reading in and reading out of information from the memory elements.

FIGURE 8 illustrates a portion of a planar magnetic memory structure, the portion showing a group of four memory elements I, II, III and IV surrounded by the remaining or framing material V. FIGURE 8 shows the winding scheme of FIGURE 7 as applied to a memory sheet having memory elements in the advantageous group-of-four arrangement. The X and Y read and write windings are arranged as described in connection with FIGURES 1 and 5. The inhibit winding $i$ extends through the central apertures C of all the elements on the sheet, and the sense winding S extends through the apertures B of all memory elements on the sheet. The bias winding $b$ extends through both of the apertures A and C of all of the memory elements on the sheet. This is accomplished without linking any of the surrounding material V by printing the bias winding through the auxiliary apertures D.

Memories constructed according to the teachings of this invention can be switched in a time in the range between 0.01 and 15 microseconds. The fabrication of many memory elements from a magnetic metal sheet is simpler and less expensive than the fabrication of an array of a comparable number of ferrite core memory elements, and yet the magnetic sheet memory provides equally good operating characteristics as regards driving current amplitudes, and superior characteristics as regards speed of operation and signal-to-noise ratios. The magnetic memory sheets will function at temperatures of 250° C. or more and will function in nuclear radiation environments. The magnetic memory sheets can be stacked close together to provide a compact memory capable of storing as many as 500,000 bits per cubic inch.

The schemes herein described for windings extending through apertures of the magnetic metal transfluxor memory elements may also be advantageously applied to transfluxor memory elements made of other magnetic materials such as ferrite.

What is claimed is:

1. A planar memory structure comprising a digit plane sheet of magnetic material cut away in a pattern defining a plurality of transfluxor memory elements each having a first aperture near a first edge, a second larger aperture near a second opposite edge, and a third central aperture, said elements being systematically arranged in Y selection columns and X selection rows with the first edges of adjacent elements near each other and the second opposite edges of adjacent elements near each other, printed Y selection read and write windings on said sheet for each Y selection column of elements, each Y selection read winding extending through the first apertures of all elements in a column and each Y selection write winding extending through the third central apertures of all elements in a column, printed X selection read and write windings on said sheet for each X selection row of elements, each X selection read winding extending through the first apertures of all elements in a row and each X selection write winding extending through the third central apertures of all elements in a row, a printed sense winding extending through the second apertures of all the memory elements of said sheet, and printed inhibit and bias winding means extending through said first and third central apertures of all the memory elements of said sheet.

2. A memory structure as defined in claim 1 wherein said inhibit and bias winding means is constituted by a single conductor extending through both the first and third central apertures of all the elements.

3. A memory structure as defined in claim 1 wherein said inhibit and bias winding means is constituted by a combination inhibit and bias winding extending through said first aperture and by a combination inhibit and bias winding extending through said third central aperture.

4. A memory structure as defined in claim 1 wherein said inhibit and bias winding means is constituted by an inhibit winding extending through said third central aperture and by a bias winding extending through both said first aperture and said third central aperture.

References Cited by the Examiner

UNITED STATES PATENTS

| | | | |
|---|---|---|---|
| 2,911,631 | 11/59 | Warren | 340—174 |
| 2,923,923 | 2/60 | Raker | 340—174 |
| 2,926,342 | 2/60 | Rogers | 340—174 |

IRVING L. SRAGOW, *Primary Examiner.*

BERNARD KONICK, JOHN F. BURNS, *Examiners.*